United States Patent
Cohen et al.

(10) Patent No.: US 9,654,622 B1
(45) Date of Patent: May 16, 2017

(54) AUTOMATICALLY ALTERING CHARACTERISTICS OF AUDIO ALERTS

(71) Applicant: Google Inc., Mountain View, CA (US)

(72) Inventors: Gabriel Aaron Cohen, Alameda, CA (US); Punyabrata Ray, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 15/286,100

(22) Filed: Oct. 5, 2016

(51) Int. Cl.
| | | |
|---|---|---|
| *H04M 1/56* | (2006.01) | |
| *H04M 15/06* | (2006.01) | |
| *H04M 1/00* | (2006.01) | |
| *H04M 3/00* | (2006.01) | |
| *H04M 3/42* | (2006.01) | |
| *H04M 7/00* | (2006.01) | |
| *H04M 3/02* | (2006.01) | |

(52) U.S. Cl.
CPC ......... *H04M 3/42051* (2013.01); *H04M 3/02* (2013.01); *H04M 3/42059* (2013.01); *H04M 3/42348* (2013.01); *H04M 7/0033* (2013.01); *H04M 2250/60* (2013.01)

(58) Field of Classification Search
CPC .............. H04M 1/2745; H04M 1/578; H04M 1/72555; H04M 3/02; H04M 3/42059; H04M 3/436; H04M 3/4365; H04M 19/04; H04M 19/041; H04M 19/044; H04M 2203/551; H04M 2250/60; H03G 3/32; G10H 2230/021; G10H 1/0025; C08G 59/245; C08G 59/5033; C08G 59/621; C08G 63/42
USPC ............ 379/142.01, 142.05, 142.17, 373.01, 379/373.02, 373.03, 374.01, 374.03, 379/376.01
See application file for complete search history.

(56) References Cited

U.S. PATENT DOCUMENTS

| | | | | |
|---|---|---|---|---|
| 5,315,057 | A | 5/1994 | Land et al. | |
| 7,729,487 | B2 | 6/2010 | Koch | |
| 8,036,391 | B2* | 10/2011 | Cronin | H03G 3/32 |
| | | | | 379/373.01 |
| 8,116,826 | B2* | 2/2012 | Kraft | H04M 1/72522 |
| | | | | 379/106.09 |
| 8,271,506 | B2* | 9/2012 | Martinez | G06F 17/30702 |
| | | | | 707/755 |
| 2005/0283753 | A1* | 12/2005 | Ho | G06F 17/30958 |
| | | | | 717/102 |
| 2006/0258340 | A1 | 11/2006 | Eronen | |

(Continued)

OTHER PUBLICATIONS

Lee, "Egotone: Generative Ringtone Engine", 4th International Mobile Music Workshop, May 6-8, 2007, 2 pgs.

(Continued)

*Primary Examiner* — Binh Tieu
(74) *Attorney, Agent, or Firm* — Shumaker & Sieffert, P.A.

(57) ABSTRACT

In general, a computing device is described that receives an indication of a particular communication from a particular sender. The computing device determines a relationship score based at least in part on a relationship context between the particular sender and a user of the computing device. The relationship score indicates a degree of strength of a relationship between the particular sender and the user of the computing device. While outputting an alert indicative of the communication, the computing device adjusts one or more characteristics of the alert based at least in part on the relationship score.

20 Claims, 6 Drawing Sheets

(56) References Cited

U.S. PATENT DOCUMENTS

| | | | | |
|---|---|---|---|---|
| 2010/0202622 A1* | 8/2010 | Hardee | ............... | H04M 19/044 |
| | | | | 381/57 |
| 2011/0123017 A1* | 5/2011 | Fitchmun | .............. | H04M 19/04 |
| | | | | 379/373.02 |
| 2016/0182716 A1* | 6/2016 | Tatourian | ................ | H04W 4/12 |
| | | | | 455/413 |

OTHER PUBLICATIONS

Android Freeware, FoxyRing, Retrieved on Jul. 11, 2014 from http://www.freewarelovers.com/android/app/foxyring, 1 pg.

DeepMind, WaveNet: A Generative Model for Raw Audio, Retrieved on Sep. 12, 2016 from https://deepmind.com/blog/wavenet-generative-model-raw-audio/, 10 pgs.

* cited by examiner

AUTOMATICALLY ALTERING CHARACTERISTICS OF AUDIO ALERTS

BACKGROUND

A computing device may output an alert indicative of the receipt of a communication. For example, a computing device may output an audible, visual, haptic or other type of alert each time the device receives a new communication or other type of notification data. Some computing devices can be manually configured to output specific, predefined alerts (e.g., a specific ringtone, vibration pattern, etc.) when certain types of communications are received or when communications are received from specific senders. However, due to the tedium involved with manually assigning alerts to communication types or specific senders in a contact list, this function may go unused or if used, the observable differences between different predefined alerts may be so slight that the predefined alerts alone provide little to no context as to who may be contacting the user. Further, different computing devices may have similar or even identical libraries of predefined alerts. If a computing device is manually configured to output a unique, predefined alert for each contact in device contact list, the output of a unique, predefined alert may be less effective in obtaining the attention of a user when the user in the presences of other computing devices (e.g., in a public space) that could also be the source of that particular alert.

SUMMARY

In one example, the disclosure is directed to a method that includes receiving, by a computing device, an indication of a particular communication from a particular sender. The method further includes determining, by the computing device, based at least in part on a relationship context between the particular sender and a user of the computing device, a relationship score indicating a degree of strength of a relationship between the particular sender and the user of the computing device. The method also includes, while outputting an alert indicative of the communication, adjusting, by the computing device and based at least in part on the relationship score, one or more characteristics of the alert.

In another example, the disclosure is directed to a computing device that includes at least one processor and at least one non-transitory computer-readable storage medium storing instructions that are executable by the at least one processor to receive an indication of a particular communication from a particular sender. The instructions are further executable by the at least one processor to determine, based at least in part on a relationship context between the particular sender and a user of the computing device, a relationship score indicating a degree of strength of a relationship between the particular sender and the user of the computing device. The instructions are also executable by the at least one processor to, while outputting an alert indicative of the communication, adjust, based at least in part on the relationship score, one or more characteristics of the alert.

In another example, the disclosure is directed to a non-transitory computer-readable storage medium storing instructions that, when executed, cause at least one processor of a computing device to receive an indication of a particular communication from a particular sender. The instructions further cause the at least one processor to determine, based at least in part on a relationship context between the particular sender and a user of the computing device, a relationship score indicating a degree of strength of a relationship between the particular sender and the user of the computing device. The instructions also cause the at least one processor to, while outputting an alert indicative of the communication, adjust, based at least in part on the relationship score, one or more characteristics of the alert.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
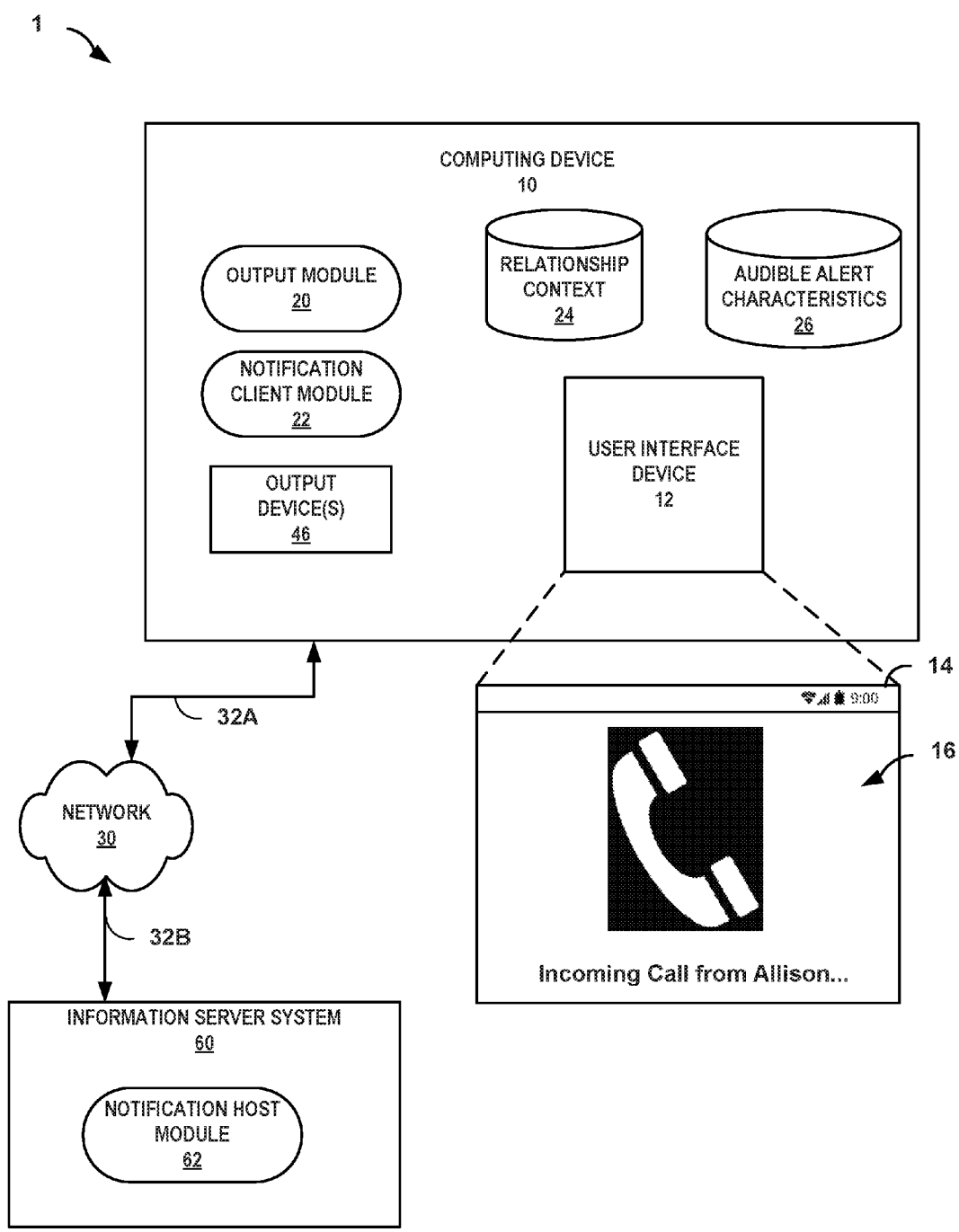
FIG. 1 is a conceptual diagram illustrating an example computing system configured to output alerts indicative of a received communication and adjust one or more characteristics of the alert based on a relationship score between the sender of the communication and a user of the computing device, in accordance with one or more aspects of the present disclosure.

In general, techniques of this disclosure may enable a computing device to dynamically adjust one or more characteristics of alerts, such as audible alerts, tactile alerts, or visual alerts, that are output based on received communications to indicate to a user of the computing device, a degree or strength of a relationship between the user and a sender of the communications. For example, a computing device may receive a communication from a particular sender. The computing device may determine a relationship score indicating a degree of strength of a relationship between the particular sender and the user of the computing device. For instance, the computing device may determine the relationship score based at least in part on a relationship context between the particular sender and the user. Examples of a relationship context include a frequency at which the particular sender and the user contact one another, or whether a social media account or profile of the particular sender and a social media account or profile of the user are connected or somehow linked on a social media platform. While outputting an alert indicative of the communication, the computing device may adjust one or more characteristics of the alert based on the relationship score to indicate to the user, the degree of strength.

For instance, the computing device may receive a telephone call from a computing device of a close friend. The computing device may determine a high relationship score associated with the telephone call based on a determination that a computing device of the close friend frequently contacts the computing device of the user or based on a determination that a social media account or profile associated with the close friend is connected to a social media account or profile of the user. In response to determining the high relationship score, the computing device, while outputting the audible alert indicative of the communication from the close friend, may increase the tempo of the audible alert or adjust some other characteristic(s) associated with the audible alert to generally indicate that someone close to the user is attempting to contact the computing device of the user, without necessarily indicating the particular sender of the communication.

Conversely, the computing device may receive a telephone call from a computing device of a telemarketer. The computing device may determine a low relationship score associated with the telephone call based on a determination that this communication is a first communication received from the computing device of the telemarketer or in response to determining that the computing device of the telemarketer infrequently contacts the computing device of the user. In response to determining the low relationship score, the computing device, while outputting the audible alert indicative of the communication from the close friend, may decrease the tempo of the audible alert to generally indicate that someone who is not close or is possibly unknown to the user is attempting to contact the computing device of the user, without necessarily specifying the particular sender of the communication.

In this manner, the computing device may signify a strength of a relationship between a sender of a communication and a user when alerting the user to a new communication. Rather than manually assigning specific and slightly different alerts to individual contacts, the computing device may output an alert that provides a general indication of the relationship between the sender and the user without confusing the user with superfluous alert types. In this way, the closeness of the sender to the user may be easily discernable based on characteristics of the audible alert so the user can quickly and easily determine whether the user wants to respond to the communication. As such, the computing device may receive fewer inputs from the user interacting with the computing device (e.g., to check on the sender of the communication or to reluctantly respond to the communication) and may perform fewer operations in response thereto (e.g., redisplaying the communication information or sending responses to the communication), thereby consuming less electrical power.

Throughout the disclosure, examples are described where a computing device and/or a computing system may analyze information (e.g., locations, speeds, the content of the user interface, incoming messages, etc.) associated with a computing device only if the computing device receives permission from the user to analyze the information. For example, in situations discussed below in which the computing device may collect or may make use of information associated with the user, the user may be provided with an opportunity to provide input to control whether programs or features of the computing device can collect and make use of user information (e.g., information about a user's current location, current speed, etc.), or to dictate whether and/or how to the computing device may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device.

FIG. 1 is a conceptual diagram illustrating an example computing system 1 with an example computing device 10 configured to output alerts indicative of a received communication and adjust one or more characteristics of the alert based on a relationship score between the sender of the communication and a user of computing device 10, in accordance with one or more aspects of the present disclosure. Computing system 1 of FIG. 1 is an example computing system that includes computing device 10, information server system 60, and network 30.

Network 30 represents any public or private communication network, for instance, a cellular, Wi-Fi, and/or other type of network for transmitting data between computing devices. Computing device 10 and information server system 60 may send and receive data across network 30 using any suitable communication techniques. For example, computing device 10 may be operatively coupled to network 30 using network link 32A. Information server system 60 may be operatively coupled to network 30 by network link 32B. Network 30 may include network hubs, network switches, network routers, etc., that are operatively inter-coupled thereby providing for the exchange of information between computing device 10 and information server system 60. In some examples, network links 32A and 32B may be Ethernet, ATM or other network connections. Such connections may be wireless and/or wired connections.

Information server system 60 represents any suitable remote computing system, such as one or more desktop computers, laptop computers, mobile phones, tablet computers, mainframes, servers, cloud computing systems, etc. capable of sending and receiving information across network link 32B to network 30. In some examples, information server system represents a host server for a notification system service. One or more computing devices, such as computing device 10, may access a notification service hosted by information server system 60 for transmitting and/or receiving notification data between platforms, applications, and services executing at the one or more computing devices. In some examples, information server system 60 represents a cloud computing system that provides notification services through network 30 to one or more computing devices, such as computing device 10, that access the notification services via access to the cloud provided by information server system 60. For example, information server system 60 may be a mobile phone and computing device 10 may be a smart watch device operably connected to information server system 60. The mobile phone (i.e., information server system 60) may receive notification data from an outside server or network. Upon receiving the notification data, the mobile phone may forward the notification data to the smart watch device (i.e., computing device 10) via network 30, which may be a short-link radio connection for the purposes of this example.

In the example of FIG. 1, information server system 60 includes notification host module 62. Notification host module 62 may perform operations described using software, hardware, firmware, or a mixture of hardware, software, and firmware residing in and/or executing at information server system 60. Information server system 60 may execute notification host module 62 with multiple processors or multiple devices. Information server system 60 may execute notification host module 62 as a virtual machine executing on underlying hardware. Notification host module 62 may execute as a service of an operating system or computing platform. Notification host module 62 may execute as one or more executable programs at an application layer of a computing platform.

Notification host module 62 may perform functions for routing communication data between one or more computing devices, such as computing device 10, over network 30. For example, notification host module 62 may perform functions for hosting a notification service and outputting communication data associated with platforms, applications, and/or services executing at computing device 10. For example, notification host module 62 may receive communication data indicative of an event associated with an e-mail message account (e.g., a new message received) associated with computing device 10 and send the communication data across network 30 to computing device 10. Notification host module 62 may also forward telephone communications to computing device 10 via network 30. Computing device 10 may receive the communication data from notification host module 62 of information server system 60 via network link 32B and provide an alert at computing device 10 to indicate the receipt of the communication data.

In the example of FIG. 1, computing device 10 is a mobile computing device (e.g., a mobile phone). However, in other examples, computing device 10 may be a tablet computer, a personal digital assistant (PDA), a laptop computer, a gaming system, a media player, an e-book reader, a television platform, an automobile navigation system, a wearable computing device (e.g., a computerized watch, computerized eyewear, a computerized glove), or any other type of mobile or non-mobile computing device.

As shown in FIG. 1, computing device 10 includes a user interface device (UID) 12. UID 12 of computing device 10 may function as an input device for computing device 10 and as an output device. UID 12 may be implemented using various technologies. For instance, UID 12 may function as an input device using a presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. UID 12 may function as an output (e.g., display) device using any one or more display devices, such as a liquid crystal display (LCD), dot matrix display, light emitting diode (LED) display, organic light-emitting diode (OLED) display, e-ink, or similar monochrome or color display capable of outputting visible information to a user of computing device 10.

UID 12 of computing device 10 may include a presence-sensitive display that may receive tactile input from a user of computing device 10. UID 12 may receive indications of the tactile input by detecting one or more gestures from a user of computing device 10 (e.g., the user touching or pointing to one or more locations of UID 12 with a finger or a stylus pen). UID 12 may present output to a user, for instance at a presence-sensitive display. UID 12 may present the output as a graphical user interface (e.g., user interface 14), which may be associated with functionality provided by computing device 10. For example, UID 12 may present various user interfaces of components of a computing platform, operating system, applications, or services executing at or accessible by computing device 10 (e.g., an electronic message application, an Internet browser application, a mobile operating system, etc.). A user may interact with a respective user interface to cause computing device 10 to perform operations relating to a function.

Computing device 10 may include one or more output devices 46 configured to generate output. Examples of output are tactile, audible, and visual output. Output devices 46 of computing device 10 may include one or more of a presence-sensitive display, sound card, video graphics adapter card, speaker, cathode ray tube (CRT) monitor, liquid crystal display (LCD), or any other type of device for generating output to a human or machine.

Computing device 10 may include output module 20, and notification client module 22. Modules 20 and 22 may perform operations described using software, hardware, firmware, or a mixture of hardware, software, and firmware residing in and/or executing at computing device 10. Computing device 10 may execute modules 20 and 22 with one or more processors. Computing device 10 may execute modules 20 and 22 as a virtual machine executing on underlying hardware. Modules 20 and 22 may execute as a service or component of an operating system or computing platform. Modules 20 and 22 may execute as one or more executable programs at an application layer of a computing platform. UID 12 and modules 20 and 22 may be otherwise arranged remotely to and remotely accessible to computing device 10, for instance, as one or more network services operating at network 30 in a network cloud.

Notification client module 22 may perform functions associated with receiving, managing, and otherwise handling at least a portion of the communication data generated and/or received by platforms, applications, and services executing at computing device 10. Notification client module 22 may cause output module 20 to output an alert (e.g., an audible alert, a visual alert, a vibration, etc.) to indicate the receipt of the communication data by computing device 10. Notification client module 22 may receive communication data from information server system 60 and output the received communication data to a recipient platform, application, and/or service executing at computing device 10. Notification client module 22 may receive communication data generated by a platform, application, and/or service executing at computing device 10 and output the received communication data to information server system 60. Notification client module 22 may further receive communication data generated by one component of a platform, application, and/or service executing at computing device 10 and output the received communication data to a different component of a platform, application, and/or service executing at computing device 10.

As used throughout the disclosure, the term "communication data" is used to describe various types of information that may indicate the occurrence of an event associated with various platforms, applications, and services executing within an execution environment at one or more computing devices, such as computing device 10. For example, communication data may include, but is not limited to, information specifying an event such as: a voice telephone call, a video telephone call, the receipt of a communication message (e.g., e-mail, instant message, SMS, etc.) by a messaging account associated with a computing device, the receipt of information by a social networking account associated with computing device 10, a reminder of a calendar event (meetings, appointments, etc.) associated with a calendar account of computing device 10, information generated and/or received by a third-party application executing at computing device 10, the transmittal and/or receipt of inter-component communications between two or more components of platforms, applications, and/or services executing at computing device 10, etc.

Notification client module 22 may handle communication data as computing device 10 receives the communication data from information server system 60. For instance, computing device 10 may include a notification queue for processing communication data. Notification client module 22 may place the received communication data into the notification queue. Output module 20, which may also have access to the notification queue, may analyze the communication data in the notification queue and determine whether to output alerts associated with the received communication data and/or at what intensity to output alerts associated with the received communication data. Further, as is described in more detail below and with respect to the additional FIGS., output module 20 may determine based on an analysis of the communication data stored in the notification queue of computing device 10, relationship scores between a user of computing device 10 and senders of the communication data. While outputting audible alerts via output devices 46, output module 20 may adjust one or more characteristics of the audible alert, based on a relationship score between a user of computing device 10 and a particular sender of the communication data.

In general, output module 20 manages input and output functions for providing a user interface associated with computing device 10 including the presentation of alerts and other information. In addition to managing output of audible alerts and adjusting characteristics of the audible alerts based on relationships between a user and a sender of communication data, output module 20 may manage the presentation of graphical, haptic, and other types of alerts as well. In addition, output module 20 may cause UID 12 to output a graphical user interface, such as user interface 14 or another example user interface, for display and, as a user of computing device 10 interacts with user interface presented at UID 12, output module 20 may interpret inputs detected at UID 12 (e.g., as a user provides one or more gestures at a location of UID 12 at which user interface 14 or another example user interface is displayed). Output module 20 may relay information about the inputs detected at UID 12 to one or more associated platforms, operating systems, applications, and/or services executing at computing device 10 to cause computing device 10 to perform a function.

Output module 20 may receive information and instructions from one or more associated platforms, operating systems, applications, and/or services executing at computing device 10 (e.g., notification client module 22) for generating user interface 14. In addition, Output module 20 may act as an intermediary between the one or more associated platforms, operating systems, applications, and/or services executing at computing device 10 and various output devices of computing device 10 (e.g., speakers, LED indicators, vibrators, etc.) to produce output (e.g., graphical, audible, hepatic, etc.) with computing device 10.

For instance, user interface 14 is one example graphical user interface for presenting one or more graphical indications of communication data received by computing device 10. User interface 14 includes graphical indication 16. Graphical indication 16 corresponds to an audible alert being outputted by computing device 10 in response to communication data received at computing device 10, and graphical indication 16 may be output simultaneously with the audible alert. In the example of FIG. 1, graphical indication 16 represents a visual alert indicative of the receipt of communication data associated with a telephone call received from a contact in the computing device's address book (i.e., Allison).

Output module 20 may ultimately control when and how (e.g., in what form) communication alerts are output to a user. Output module 20 may receive, as input from notification client module 22, graphical information (e.g., text data, images data, etc.) based on the communication data that notification client module 22 receives. Additionally, output module 20 may receive instructions associated with the graphical information from notification client module 22 for presenting the graphical information as graphical indication 16 within user interface 14. Based on the graphical information and the instructions received from notification client module 22, output module 20 may cause UID 12 to present graphical indication 16 within user interface 14 to alert a user of computing device 10 of the receipt of communication data associated with graphical indication 16. In addition, output module 20 may cause output devices 46 to output an audible, visual, haptic, or other type of alert notifying the user to the receipt of the communication data. Output module 20 may control the frequency and form with which such notification alerts are output to the user.

In accordance with techniques of this disclosure, computing device 10 may dynamically adjust one or more characteristics of audible alerts that are output based on received communications to indicate to a user of computing device 10, a degree or strength of a relationship between the user and a sender of the communications. For example, notification client module 22 of computing device 10 may receive an indication of a particular communication from a particular sender. For example, notification client module 22 of computing device 10 may receive communication data from information server system 60 via network 30 that indicates an incoming telephone call from Allison. In the example of FIG. 1, the communication data may further be associated with graphical indication 6, which includes a graphical indication of the incoming telephone call from Allison.

Output module 20 of computing device 10 may determine, based at least in part on a relationship context between the particular sender and a user of computing device 10, a relationship score indicating a degree of strength of a relationship between the particular sender and the user of computing device 10. For instance, responsive to notification client module 22 receiving the particular communication from information server system 60, notification client module 22 may place data associated with the communication into a notification queue. Output module 20 may access this notification queue and obtain the data regarding the particular communication. Based on this obtained data, output module 20 may determine an identity of the particular sender of the particular communication. In the example of FIG. 1, output module 20 may access the data in the notification queue to determine the identity of the particular sender of the received communication to be Allison. Using this identity, output module 20 may determine a relationship score between the user of computing device 10 and Allison based on a relationship context between the user of computing device 10 and Allison.

Various examples of a relationship context exist. In general, as used in this disclosure, the term "relationship context" represents information that characterizes a social relationship between the sender of a communication and a recipient of the communication. In the context of this disclosure, the relationship context may include, or be based on data obtained from or using the computing device of the recipient (e.g., computing device 10). For instance, the relationship context may include information pertaining a frequency at which one or more computing devices associated with the sender sends communications to one or more computing devices, including computing device 10, associated with the user. In other instances, the relationship context may include information about whether computing device 10 includes contact information for the one or more computing devices associated with the sender in computing device 10, information about a connection status between a social media account for an application on the one or more computing devices associated with the user and a social media account of the particular sender, or information or data about an average time between when computing device 10 begins to output an audible alert in response to receiving a communication from the one or more computing devices associated with the sender and when computing device 10 receives an indication of a user input to respond to the communication from the one or more computing devices associated with the sender. These are just some examples of the types of information that make up a relationship context. In general, the relationship context may be based on any information or data obtainable by computing device 10 that supports the determination of a relationship score indicating a degree of strength of a relationship between the particular sender and the user of the computing device.

For example, in the context of FIG. 1, the relationship context may be a frequency at which one or more computing devices associated with Allison and one or more computing devices associated with the user, including computing device 10, send communications to each other, the presence of contact information for one or more computing devices associated with Allison in the user's contact list for computing device 10, a connection status between a social media account or profile on an application associated with computing device 10 and a social media account or profile associated with Allison, or an average time between when computing device 10 first outputs an alert in response to receiving a communication from one or more computing devices associated with Allison and when computing device 10 receives an indication of a user input to respond to the communication from the one or more computing devices associated with Allison.

Output module 20 may rely on one or more rules or models for determining a relationship score between the particular sender and the user of computing device 10. For instance, output module 20 may rely on one or more rules that cause output module 20 to determine a stronger relationship score between the user of computing device 10 and Allison if the relationship context between the user of computing device 10 and the sender of the communication (e.g., Allison) indicates that the one or more of the following is true: computing device 10 and one or more computing devices associated with Allison send communications back and forth frequently, contact information for one or more computing devices associated with Allison is in a contact list for computing device 10, Allison and the user are connected on a social media platform application executing on computing device 10, or the user typically responds to a communication from one or more computing devices associated with Allison quickly. Conversely, output module 20 may rely on one or more rules that cause output module 20 to determine a weaker relationship score between the user of computing device 10 and Allison if the relationship context between the user of computing device 10 and the sender of the communication indicates that the one or more of the following is true: computing device 10 and one or more computing devices associated with Allison rarely send communications back and forth, contact information for one or more computing devices associated with Allison is not in a contact list for computing device 10, Allison and the user are not connected on a social media platform application executing on computing device 10, or if the user typically responds to a communication from one or more computing devices associated with Allison only after a lengthy delay.

In any case, while output device 46 is outputting an audible alert indicative of the communication, output module 20 may adjust one or more characteristics of the audible alert based at least in part on the relationship score to audibly indicate to the user of computing device 10 the strength of the relationship between the user and the sender. For instance, in adjusting the characteristics of the audible alert, output module 20 may adjust a pitch of the audible alert, add or remove one or more harmonies to or from the audible alert, add or remove an instrument to or from the audible alert, adjust a tempo of the audible alert, play an additional version of a melody of the audible alert at an alternate octave, change a melody instrument for the audible alert, adjust a texture of the audible alert, change a key of the audible alert, or change a meter of the audible alert, among other things.

In other examples, computing device 10 may pre-generate the altered audible alert. In other words, prior to outputting the audible alert, computing device 10 may alter one or more characteristics the audible alert and output the altered audible alert. In still other examples, computing device 10 may pre-generate multiple audible alerts, each with different characteristics. Computing device 10 may associate each of these pre-generated audible alerts with a certain relationship score or a range of relationship scores. Responsive to determining the relationship score of a particular sender, computing device 10 may select one of the pre-generated audible alerts that is associated with the determined relationship score and output the selected pre-generated audible alert.

Output module 20 may adjust the characteristics of an audible alert in any manner that may be indicative of the relationship score. For instance, responsive to output module 20 determining that Allison and the user have a strong relationship score, output module 20 may adjust the audible alert in way that generally conveys a happier emotion, such as adding major harmonies or raising the beats per minute of the audible alert. Conversely, responsive to output module 20 determining that Allison and the user have a weak relationship score, output module 20 may adjust the audible alert in way that generally conveys a melancholier emotion, such as adding minor or diminished harmonies or lowering the beats per minute of the audible alert. This is only one example of ways that the relationship score may influence the audible alert. In other instances, the relationship score may influence the audible alert in other ways. In general, output module 20 adjusts the audible alert based on the relationship score in any manner that distinguishes a weak relationship score from a strong relationship score.

In this manner, computing device 10 of FIG. 1 may signify a strength of a relationship between a sender of a communication and a user when alerting the user of computing device 10 to a new communication. Rather than manually assigning specific and slightly different alerts to individual contacts, computing device 10 may output an alert that provides a general indication of the relationship between the sender and the user without confusing the user with superfluous alert types. In this way, the closeness of the sender to the user may be easily discernable based on characteristics of the audible alert so the user can quickly and easily determine whether the user wants to respond to the communication. As such, computing device 10 may receive fewer inputs from the user interacting with the computing device (e.g., to check on the sender of the communication or to reluctantly respond to the communication) and may perform fewer operations in response thereto (e.g., redisplaying the communication information or sending responses to the communication), thereby consuming less electrical power.

The techniques described herein may further have benefits for people who are visually impaired. For example, if a user has a visual impairment, a computing device that outputs a default or predefined alert and/or a graphical indication identifying the sender of a communication may be ineffective in notifying the visually impaired user as to the identity of the sender of the communication or may be ineffective in indicating whether the visually impaired user shares any relationship with the sender of the communication. In contrast, by dynamically altering characteristics of the ringtone based on a relationship score, computing device 10 may effectively indicate a closeness of the sender of the communication to the visually impaired user of computing device 10, thereby providing a more effective audible alert that actually informs the visually impaired user whether the visually impaired user shares any relationship with the sender of the communication.

Figure 2:
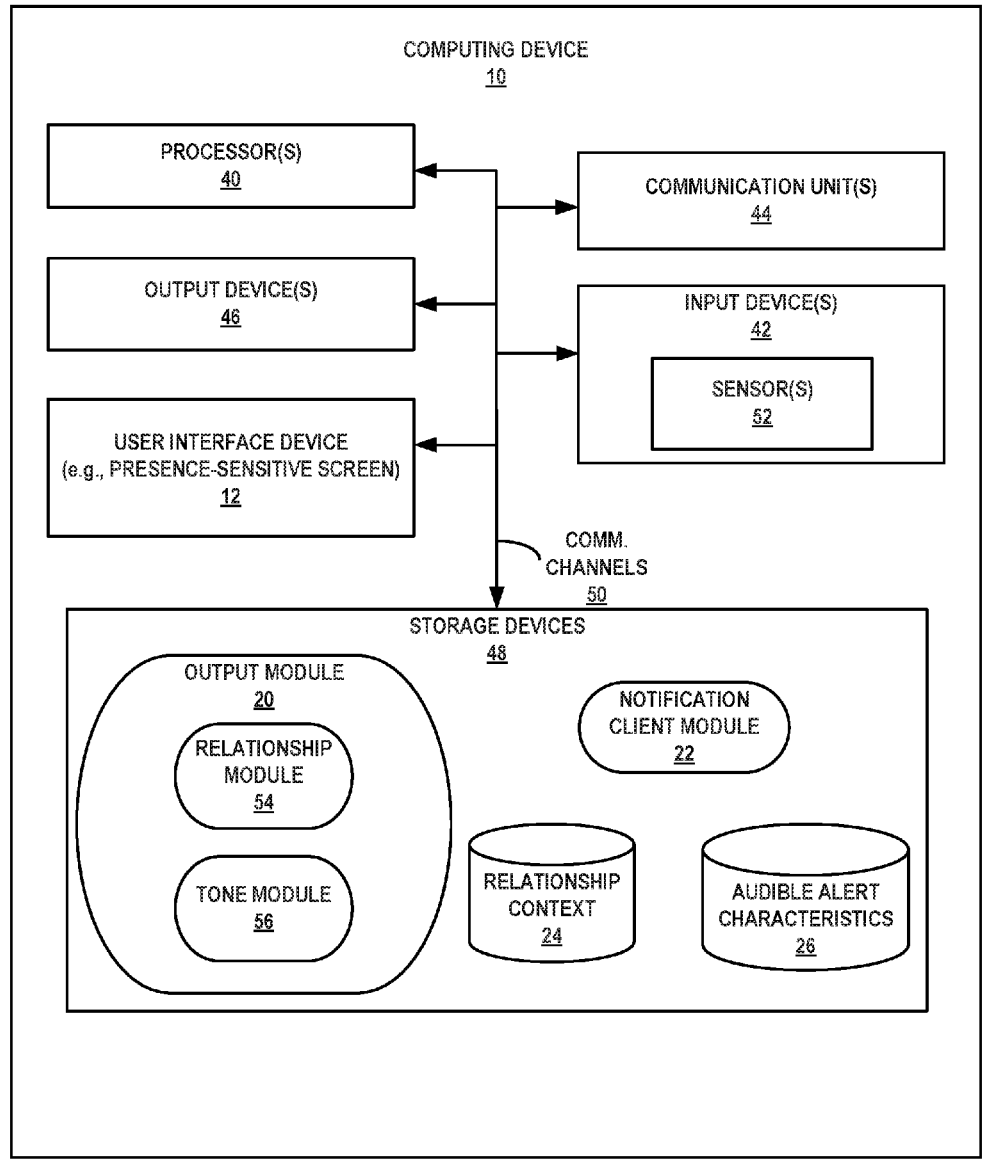
FIG. 2 is a block diagram illustrating an example computing device configured to output alerts indicative of a received communication and adjust one or more characteristics of the alert based on a relationship score between the sender of the communication and a user of the computing device, in accordance with one or more aspects of the present disclosure.

FIG. 2 is a block diagram illustrating an example computing device 10 configured to output alerts indicative of a received communication and adjust one or more characteristics of the alert based on a relationship score between the sender of the communication and a user of computing device 10, in accordance with one or more aspects of the present disclosure. Computing device 10 of FIG. 2 is described below within the context of system 1 of FIG. 1. FIG. 2 illustrates only one particular example of computing device 10 and many other examples of computing device 10 may be used in other instances. In the example of FIG. 2, computing device 10 may be a wearable computing device, a mobile computing device, or a non-portable (e.g., desktop, etc.) computing device. Computing device 10 of FIG. 2 may include a subset of the components included in example computing device 10 or may include additional components not shown in FIG. 2.

As shown in the example of FIG. 2, computing device 10 includes user interface device 12 ("UID 12"), one or more processors 40, one or more input devices 42, one or more communication units 44, one or more output devices 46, one or more storage devices 48, and one or more sensors 52. Storage devices 48 of computing device 10 also include output module 20, notification client module 22, relationship context 24, and audible alert characteristics 26. Output module 20 may further include relationship module 54 and tone module 56. Output module 20 and notification client module 22 may rely on information stored as relationship context 24 and audible alert characteristics 26 at storage device 48. In other words, as is described in more detail below, output module 20 may be operable by processors 40 to perform read/write operations on information, stored as relationship context 24, at storage device 48. Output module 20 may then access the information stored in relationship context 24 and audible alert characteristics 26 to perform a function of computing device 10.

Communication channels 50 may interconnect each of the components 12, 20, 22, 24, 26, 40, 42, 44, 46, 48, 52, 54, and 56 for inter-component communications (physically, communicatively, and/or operatively). In some examples, communication channels 50 may include a system bus, a network connection, an inter-process communication data structure, or any other method for communicating data.

As shown in FIG. 2, computing device 10 may include one or more sensors 52 (sensors 52). Sensors 52 may include an accelerometer that generates accelerometer data. Accelerometer data may indicate an acceleration and/or a change in acceleration of computing device 10. Sensors 52 may include a gyrometer that generates gyrometer data. Gyrometer data may indicate a physical orientation and/or change in physical orientation of computing device 10. In some examples, the orientation may be relative to one or more reference points. Sensors 52 may include a magnetometer that generates magnetometer data. Magnetometer data may indicate the magnetization of an object that is touching or in proximity to computing device 10. Magnetometer data may indicate the Earth's magnetic field, and in some examples, provide directional functionality of a compass. Sensors 52 may include a barometer for sensing barometric pressure associated with computing device 10. Computing device 10 may infer a change in elevation or detect movement based on the barometric pressure data obtained by a barometer of sensors 52.

Sensors 52 may include an ambient light sensor that generates ambient light data. The ambient light data may indicate an intensity of light to which computing device 10 is exposed. Sensors 52 may include a proximity sensor that generates proximity data. Proximity data may indicate whether an object is within proximity to computing device 10. In some examples, proximity data may indicate how close an object is to computing device 10. In some examples, sensors 52 may include a clock that generates a date and time. The date and time may be a current date and time. Sensors 52 may include a pressure sensor that generates pressure data. Pressure data may indicate whether a force is applied to computing device 10 and/or a magnitude of a force applied to computing device 10. Pressure data may indicate whether a force is applied to UID 12 and/or a magnitude of a force applied to UID 12. Sensors 52 may include a video sensor that generates picture or video data. Sensors 52 may include a global positioning system that generates location data.

One or more input devices 42 of computing device 10 may receive input. Examples of input are tactile, audio, and video input. Input devices 42 of computing device 10, in one example, includes a presence-sensitive display, touch-sensitive screen, mouse, keyboard, voice responsive system, video camera, microphone or any other type of device for detecting input from a human or machine.

One or more output devices 46 of computing device 10 may generate output. Examples of output are tactile, audio, and video output. Output devices 46 of computing device 10, in one example, includes a presence-sensitive display, sound card, video graphics adapter card, speaker, cathode ray tube (CRT) monitor, liquid crystal display (LCD), or any other type of device for generating output to a human or machine.

One or more communication units 44 of computing device 10 may communicate with external devices via one or more wired and/or wireless networks by transmitting and/or receiving network signals on the one or more networks. Examples of communication unit 44 include a network interface card (e.g. such as an Ethernet card), an optical transceiver, a radio frequency transceiver, a GPS receiver, or any other type of device that can send and/or receive information. Other examples of communication units 44 may include short wave radios, cellular data radios, wireless network radios, as well as universal serial bus (USB) controllers.

In some examples, UID 12 of computing device 10 may include functionality of input devices 42 and/or output devices 46. In the example of FIG. 2, UID 12 may be or may include a presence-sensitive input device. In some examples, a presence sensitive input device may detect an object at and/or near a screen. As one example range, a presence-sensitive input device may detect an object, such as a finger or stylus that is within 2 inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, presence sensitive input device also provides output to a user using tactile, audio, or video stimuli as described with respect to output device 46, e.g., at a display. In the example of FIG. 2, UID 12 presents a user interface (such as user interface 14 of FIG. 1).

While illustrated as an internal component of computing device 10, UID 12 also represents and external component that shares a data path with computing device 10 for transmitting and/or receiving input and output. For instance, in one example, UID 12 represents a built-in component of computing device 10 located within and physically connected to the external packaging of computing device 10 (e.g., a screen on a mobile phone). In another example, UID 12 represents an external component of computing device 10 located outside and physically separated from the packaging of computing device 10 (e.g., a monitor, a projector, etc. that shares a wired and/or wireless data path with a tablet computer).

One or more storage devices 48 within computing device 10 may store information for processing during operation of computing device 10 (e.g., computing device 10 may store data (e.g., relationship context 24 and audible alert characteristics 26) that modules 20 (including modules 54 and 56) and 22 access during execution at computing device 10). In some examples, storage device 48 is a temporary memory, meaning that a primary purpose of storage device 48 is not long-term storage. Storage devices 48 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or information (e.g., data) associated with modules 20 and 22, relationship context 24, and audible alert characteristics 26.

One or more processors 40 may implement functionality and/or execute instructions within computing device 10. For example, processors 40 on computing device 10 may receive and execute instructions stored by storage devices 48 that execute the functionality of output module 20 and notification client module 22. These instructions executed by processors 40 may cause computing device 10 to determine a relationship status between a user of computing device 10 and a sender of a received communication based on relationship context 24 and alter one or more characteristics in audible alert characteristics 26, within storage devices 48 during program execution. Processors 40 may execute instructions of modules 20 and 22 to cause UID 12 to output alerts based on notification data for display at UID 12 as content of user interface 14. That is, modules 20 and 22 may be operable by processors 40 to perform various actions or functions of computing device 10, for instance, causing UID 12 to present user interfaces 14A and 14B at UID 12.

Relationship context 24 represents any suitable storage medium for storing different relationship contexts for different senders and the various computing devices associated with the different senders. For instance, relationship context 24 may be a long-term data structure for organizing relationship context data as received and updated by relationship module 54 over time. Relationship module 54 may access relationship context 24 to determine a relationship score between a sender of a communication and a user of computing device 10. Relationship module 54 may perform read/write operations for adding information to relationship context 24 (e.g., when computing devices associated with new senders send communication data to computing device 10) or editing information from relationship context 24 (e.g., when relationship module 54 determines that the relationship context between computing devices associated with a particular sender and computing device 10 has changed).

Audible alert characteristics 26 represents any suitable storage medium for storing rules and storing and buffering reference characteristics that tone module 56 may access when determining how to alter one or more characteristics of an audible alert based on a determined relationship score. For instance, audible alert characteristics 26 may include a set of one or more reference characteristics that reflect how tone module 56 would alter one or more characteristics of an audible alert if computing device 10 received a communication from a separate computing device associated with a sender with a low relationship score with the user of computing device 10. Further, audible alert characteristics 26 may include a different set of one or more reference characteristics that reflect how tone module 56 would alter one or more characteristics of an audible alert if computing device 10 received a communication from a separate computing device associated with a sender with a high relationship score with the user of computing device 10.

In accordance with techniques of this disclosure, tone module 56 may dynamically adjust one or more characteristics of audible alerts that are output based on received communications to indicate, to a user of computing device 10, a degree or strength of a relationship between the user and a sender of the communications. For example, notification client module 22 of computing device 10 may receive an indication of a particular communication from a particular sender. For instance, notification client module 22 of computing device 10 may receive communication data from information server system 60 via network 30 that indicates an incoming video call from the user's brother. In the example of FIG. 2, the communication data may further be associated with a graphical indication output on UID 12 that indicates the incoming video call from the user's brother. In other examples, the communication may be a text message, a media message, a social media message, or an audio telephone call.

Relationship module 54 of computing device 10 may determine, based at least in part on relationship context data between the particular sender and a user of computing device 10 stored in relationship context 24, a relationship score indicating a degree of strength of a relationship between the particular sender and the user of computing device 10. For instance, responsive to notification client module 22 receiving the particular communication from information server system 60, notification client module 22 may place data associated with the communication into a notification queue. Relationship module 54 may access this notification queue and obtain the data regarding the particular communication. Based on this obtained data, relationship module 54 may determine an identity of the particular sender of the particular communication. In the example of FIG. 2, relationship module 54 may access the data in the notification queue to determine the identity of the particular sender of the received communication to be the user's brother. Using this identity, relationship module 54 may determine a relationship score between the user of computing device 10 and the user's brother based on a relationship context between the user of computing device 10 and the user's brother.

In instances where the relationship context includes a frequency at which computing device 10 receives communications from one or more computing devices associated with the particular sender, relationship context 24 may comprise a database that includes identities of particular senders and the communication frequency. For instance, relationship context 24 may include an entry for the user's brother that comprises an identifier for the user's brother (e.g., the user's brother's name, a codename for the user's brother, a code number for the user's brother, a unique string of characters and/or symbols associated with the user's brother, etc.) and a frequency at which computing device 10 receives communications from one or more computing devices associated with the user's brother. The frequency may be communications per day, communications per week, communications per month, or any other rate suitable for determining a communication frequency. Relationship module 54 may determine a stronger relationship score if the frequency for a particular identity is higher. Conversely, relationship module 54 may determine a weaker relationships core if the frequency for the particular identity is lower.

In instances where the relationship context includes information about a connection status between a social media account for an application on the one or more computing devices associated with the user and a social media account of the particular sender, relationship module 54 may further determine information about the connection. For instance, some certain social media platforms allow one-way connections, meaning that one user may subscribe to receiving posts created by another user but the other user may not be subscribed to receiving posts created by the one user. Other social media platforms require two-way connections, meaning that both users must either initiate or accept a request to view the other's information. Further, some social media platforms allow a user to classify relationships with their connections. For instance, a user may classify connections as family members, relationship partners, spouses, friends, coworkers, or acquaintances, among other things. Relationship module 54 may utilize this information on the social media platform when determining the relationship score. For instance, relationship module 54 may determine a different relationship score based on whether there is no connection, a one-way connection, or a two-way connection between the user of computing device 10 and the sender of the communication data. In other instances, relationship module 54 may determine a relationships score based on the classified relationship the sender of the communication data has with the user.

Relationship module 54 may rely on one or more rules or models for determining the relationship score between the particular sender and the user of computing device 10. For instance, relationship module 54 may rely on one or more rules that cause relationship module 54 to determine a stronger relationship score between the user of computing device 10 and the user's brother if the relationship context between the user of computing device 10 and the sender of the communication (e.g., the user's brother) indicates that the one or more of the following is true: computing device 10 and one or more computing devices associated with the user's brother send communications back and forth frequently, contact information for one or more computing devices associated with the user's brother is in a contact list for computing device 10, the user's brother and the user are connected on a social media platform application executing on computing device 10, or the user typically responds to a communication from one or more computing devices associated with the user's brother quickly. Conversely, relationship module 54 may rely on one or more rules that cause output module 20 to determine a weaker relationship score between the user of computing device 10 and the user's brother if the relationship context between the user of computing device 10 and the sender of the communication indicates that the one or more of the following is true: computing device 10 and one or more computing devices associated with the user's brother rarely send communications back and forth, contact information for one or more computing devices associated with the user's brother is not in a contact list for computing device 10, the user's brother and the user are not connected on a social media platform application executing on computing device 10, or if the user typically responds to a communication from one or more computing devices associated with the user's brother only after a lengthy delay.

For instance, in one implementation, computing device 10 may learn the relationship score of various contacts and update the relationship scores based on the rules and models. Relationship module 54 may generate rules and use deep learning or machine learning techniques to learn how a user of computing device 10 may view particular relationships based on certain actions. For instance, relationship module 54 may determine a high relationship score for a particular contact, but if a user of computing device 10 repeatedly declines communications from the particular contact, relationship module 54 may decrease the relationship score external from the other determinants. Conversely, relationship module 54 may determine a low relationship score for a particular contact, but if a user of computing device 10 repeatedly declines communications from the particular contact, relationship module 54 may decrease the relationship score external from the other determinants.

Further, over time, relationship module 54 may update the determinants used in determining a relationship score. For instance, over time communications from a particular sender may become more or less frequent as relationships are strengthened, weakened, or changed by momentous occasions (i.e., new jobs, new marriages, moving to a new location, etc.). Relationship module 54 may be configured to update the relationship score based on this updated context such that the relationship score automatically and dynamically adapts to how communication habits of the user of computing device 10 and the particular sender change over time.

For example, in the context of FIG. 2, the relationship context may be information about a connection status between a social media account for an application on the one or more computing devices associated with the user and a social media account of the particular sender. Relationship module 54 may determine a two-way connection between the user and the user's brother on a social media platform and that the user has classified the user's brother as a close family member (i.e., a sibling). As such, relationship module 54 may generally determine a higher relationship score for the user's brother.

In some examples, computing device 10 may implement the techniques of this disclosure in a cloud environment. For example, information server system 60 may be configured to operate as a cloud service and perform some or all the functionality described with respect to modules 20 and 22 of computing device 10 to cause computing device 10 to output an alert via output devices 46 in accordance with the described techniques of this disclosure. Computing device 10 may access the cloud service of information server system 60 via network 30 to receive information (e.g., date, instructions, commands, etc.) that cause computing device 10 to output an alert via output devices 46. In such instances, a server device, operating in network 30, such as information server system 60, may determine the relationship score for computing device 10. As such, in some examples, relationship module 54 may send, to the server device, an indication of the particular sender. Relationship module 54 may then receive the relationship score from the server device.

In any case, while output device 46 is outputting an audible alert indicative of the communication, tone module 56 may adjust one or more characteristics of the audible alert in audible alert characteristics 26 based at least in part on the relationship score to audibly indicate to the user of computing device 10 the strength of the relationship between the user and the sender. For instance, in adjusting the characteristics of the audible alert, tone module 56 may adjust a pitch of the audible alert, add or remove one or more harmonies to or from the audible alert, add or remove an instrument to or from the audible alert, adjust a tempo of the audible alert, play an additional version of a melody of the audible alert at an alternate octave, change a melody instrument for the audible alert, adjust a texture of the audible alert, change a key of the audible alert, or change a meter of the audible alert, among other things.

In other examples, tone module 56 may pre-generate the altered audible alert and store the audible alert in audible alert characteristics 26. In other words, prior to outputting the audible alert, tone module 56 may alter one or more characteristics the audible alert and output the altered audible alert. In still other examples, tone module 56 may pre-generate multiple audible alerts, each with different characteristics. Tone module 56 may associate each of these pre-generated audible alerts with a certain relationship score or a range of relationship scores in relationship context 24. Responsive to relationship module 54 determining the relationship score of a particular sender, relationship module 54 may save that score in relationship context 24, where tone module 56 may access the determined relationship score and select one of the pre-generated audible alerts that is associated with the determined relationship score and output the selected pre-generated audible alert.

Tone module 56 may adjust the characteristics of an audible alert in any manner that may be indicative of the relationship score. For instance, responsive to relationship module 54 determining that the user's brother and the user have a strong relationship score, tone module 56 may adjust the audible alert in way that generally conveys a happier emotion, such as adding string instruments or bright, higher-pitched instruments (e.g., a flute or a clarinet). Conversely, responsive to relationship module 54 determining that the user's brother and the user have a weak relationship score, tone module 56 may adjust the audible alert in way that generally conveys a melancholier emotion, such as adding percussion instruments or lower-pitched brass instruments (e.g., a tuba or a trombone). This is only one example of ways that the relationship score may influence the audible alert. In other instances, the relationship score may influence the audible alert in other ways. In general, output module 20 adjusts the audible alert based on the relationship score in any manner that distinguishes a weak relationship score from a strong relationship score.

In some examples, to output an audible alert, tone module 56 may first select an initial tone for the audible alert. Tone module 56 may begin outputting the audible alert with the initial tone via output device 46 (e.g., a speaker). After outputting the alert the audible alert with the initial tone for a predetermined amount of time, tone module 56 may output the audible alert with a subsequent tone. To produce the subsequent tone, tone module 56 may adjust one or more characteristics of the initial tone, as described above. For instance, tone module 56 may adjust a pitch of the initial tone, add or remove one or more harmonies to or from the initial tone, add or remove an instrument to or from the initial tone, adjust a tempo of the initial tone, play an additional version of a melody of the initial tone at an alternate octave, change a melody instrument for the initial tone, adjust a texture of the initial tone, change a key of the initial tone, or change a meter of the initial tone, among other things.

In some instances, to select the initial tone, tone module 56 may merely select a default ringtone for computing device 10. In other instances, tone module 56 may access a music profile associated with the user of computing device 10. The music profile may be an account the user has on a music streaming service. In any case, the music profile includes a compilation of musical taste indicators for the user. For instance, the music profile may include indications that the user enjoys listening to specific artists, genres, songs, instruments, or moods of music. Tone module 56 may determine, based at least in part on the music profile associated with the user, a musical preference for the user. For the purposes of this disclosure, the musical preference may be a determined favorite artist, genre, song, instrument, or mood of music based on the various strengths of the musical taste indicators. Tone module 56 may then select the initial tone based at least in part on the musical preference. For instance, if tone module 56 determines that the user has a favorite song, tone module 56 may select the favorite song as the initial tone. In other instances, if tone module 56 determines that the user has a favorite genre of music, tone module 56 may select an initial tone from the favorite genre.

In some examples, the initial tone may be stored in storage devices 48 as a sound file. In other examples, tone module 56 may retrieve the initial tone from a cloud storage device or a server. In any case, tone module 56 may be configured to analyze the initial tone to determine characteristics of the initial tone, such as pitches, tempos, instrumentation, keys, or any other musical detail of the initial tone. Tone module 56 may store these characteristics in audible alert characteristics 26. Audible alert characteristics 26 may also store other various sounds, including various other instruments played at multiple pitches in the spectrum of possible pitches for each instruments. When tone module 56 is adjusting the one or more characteristics of the initial tone for the audible alert, tone module 56 may determine which other sounds to add to the initial tone or which characteristics of the initial tone to adjust. For instance, if tone module 56 is adding a harmony to the initial tone, tone module 56 may determine an instrument used in the initial tone, determine pitches of the various notes in the initial tone, and retrieve sounds from audible alert characteristics 26 from an instrument that complements the instrument in the initial tone (e.g., either the same instrument or an instrument from the same woodwind, brass, strings, or percussion family) that would produce a harmony with the initial tone. In other instances, if tone module 56 is adjusting a pitch, key, or octave of the initial tone, tone module 56 may select sounds from the same instrument as the initial tone with pitches altered from the initial tone but in a similar arrangement and rhythm.

In adjusting the tempo or meter of the audible alert, tone module 56 may output the same audio data at either a faster speed or a slower speed. In adjusting the texture of the audible alert, changing a melody instrument of the audible alert, or adding an instrument to the audible alert, tone module 56 may select sounds from different instruments or different styles of the same instrument by with the same general melody and adjusted key.

In some examples, to adjust the one or more characteristics of the audible alert, tone module 56 may utilize a neural network associated with the audible alert. Specifically, tone module 56 may analyze samples of at least the original audible alert to identify tones, pitches, instrumentation, and other characteristics of the audible alert. Tone module 56 may further analyze samples of other audible alerts that are similar to the original audible alert to identify tones, pitches, instrumentation, and other characteristics of the other audible alerts and strengthen the neural network for the purpose of more accurately predicting pitches, tones, and instrumentations for the altered audible alert. These sample sequences may be input to the neural network as waveforms for the purpose of training the neural network. The neural network may be a multi-layered neural network where each layer of the neural network has various dilation factors that enable its receptive field to grow exponentially with depth and cover thousands of time-steps. From this neural network, tone module 56 may sample the neural network to generate synthetic sequences that match or complement the instrumentation, pitch, and tone of the inputted waveforms. During the sampling, tone module 56 may determine a value drawn from a probability distribution computed from the neural network. Tone module 56 may then input this value into a new prediction for the next step of generating the synthetic sequence, stringing together a synthetic sequence of realistic sounding audio that complements the initial audible alert. By utilizing a trained neural network generated from samples including the original audible alert, tone module 56 may synthetically generate realistic sounding audio, enabling tone module 56 to produce customized and alterations to the original audible alert that sounds realistic and aesthetically pleasing without actually storing large data files of every potential tone that may be output by computing device 10.

In some examples, tone module 56 may adjust the one or more characteristics of the audible alert based on other information in addition to the relationship score. For instance, tone module 56 may adjust the one or more characteristics of the audible alert based on contextual information associated with computing device 10. In some examples, the contextual information may include environmental information about a current operating environment of computing device 10, such as a location of the computing device, a current time of day, or a current weather status. In such instances, tone module 56 may determine the contextual information associated with computing device 10 and adjust the one or more characteristics of the audible alert based at least in part on the relationship score and the contextual information.

For instance, in the context of FIG. 2, tone module 56 may determine a strong relationship score between the user and the user's brother. As such, tone module 56 may first adjust the initial tone by adding string instruments to the initial tone. Tone module 56 may then determine the user is at a location that requires less distraction and quieter or softer alerts, such as a workplace. Tone module 56 may further adjust the initial tone by slowing the tempo of the audible alert, decreasing an output volume of the audible alert, or introducing softer instruments. Conversely, if tone module 56 determines that the user is at home or a park, where the user may have a harder time hearing the audible alert, tone module 56 may speed up the tempo of the audible alert, increase an output volume of the audible alert, or introduce more prominent instruments into the audible alert.

In one example, tone module 56 may output the first 5 seconds of the audible alert as a static arrangement of instruments in a repeating or non repeating form, which can be seeded with a unique personal identifier (e.g. an International Mobile Equipment Identity). As such, each distinct computing device may utilize an individualized recognizable ringtone. Further, each brand, make, or model of computing device 10 may keep the individualized audible alerts similar across each computing device in the same brand, make, or model. For instance, the audible alerts may be 95% similar across all devices such that the brand, make, or model is easily recognizable for the first 5 seconds. Tone module 56 may then modify the one or more characteristics of the audible alert in a repeating or nonrepeating pattern based on the intensity of social tie with the incoming contact (e.g. a frequency at which computing device 10 receives communications from one or more computing devices associated with the incoming contact). 7 seconds after beginning to output the audible alert, tone module 56 may further modify the audible alert such that another instrument enters which is harmonically complementary, but which instrument is based on weather or time of day. In general, computing device 10 may have default ringtone may be a live machine generated composition which has a distinctive theme and opening stanza, but which evolves partially randomly, partially based on contextual seeds like time of day or location, and partially based on inputs describing the incoming contact.

Although the above examples were provided in the context of an audible alert, techniques of this disclosure may apply to other types of alerts, as well. For instance, the alert may be a tactile alert. In such examples, computing device 10 may provide a sequence of vibrations as the alert indicative of the communication. As such, while outputting the tactile alert, computing device 10 may adjust one or more characteristics of the tactile alert bit adjusting one of a vibration rate, a vibration pattern, or a vibration intensity of the tactile alert.

In other instances, the alert may be a visual alert. In such examples, computing device 10 may provide a sequence of light flashes as the alert indicative of the communication. As such, while outputting the visual alert, computing device 10 may adjust one or more characteristics of the visual alert bit adjusting one of a flash rate, a flash pattern, or a flash intensity of the tactile alert.

Figure 3A:
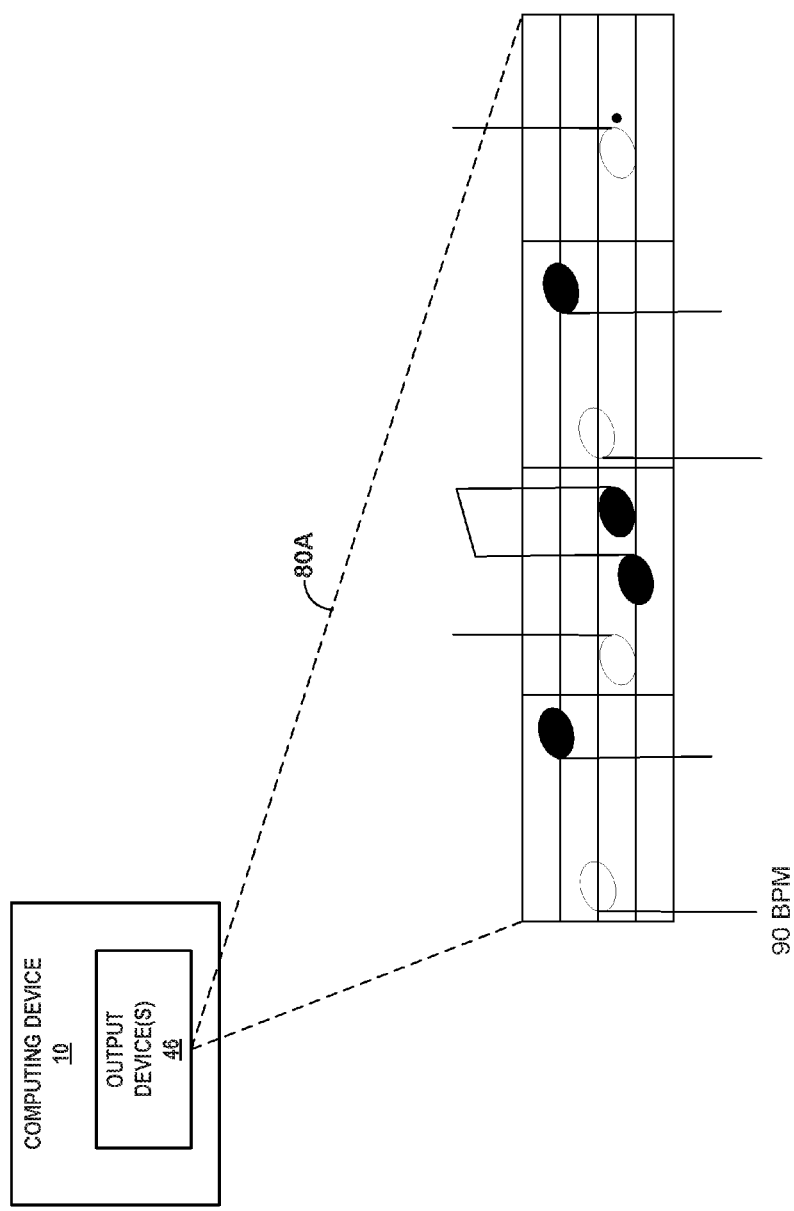
FIGS. 3A-3C are conceptual diagrams illustrating example adjustments that a computing device may make to one or more characteristics of an alert based on a relationship score between the sender of a communication and a user of the computing device, in accordance with one or more aspects of the present disclosure.
Figure 3B:
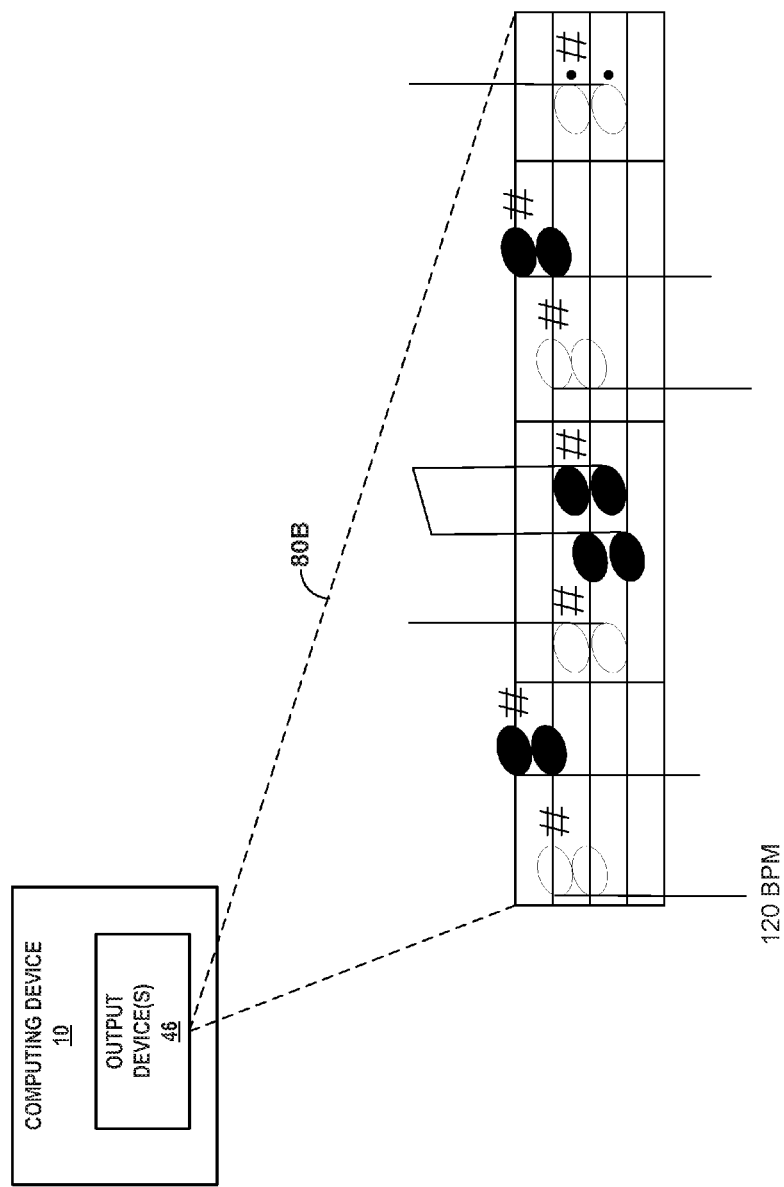
Figure 3C:
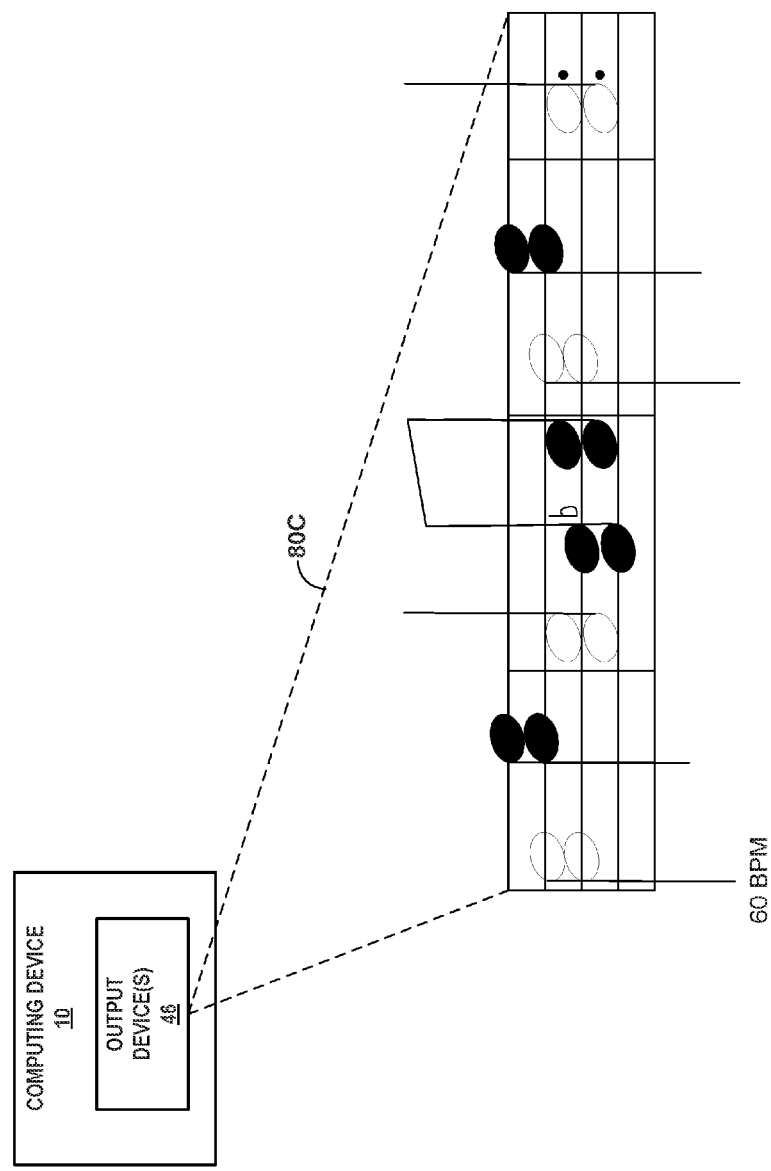

FIGS. 3A-3C are conceptual diagrams illustrating example adjustments that a computing device may make to one or more characteristics of an alert based on a relationship score between the sender of a communication and a user of the computing device, in accordance with one or more aspects of the present disclosure. The operations of computing device 10 are described within the context of system 1 of FIG. 1 and computing device 10 of FIG. 2. The conceptual diagrams of FIGS. 3A-3C include example melodies 80A-80C which are meant to show variations in musical and audible characteristics of an audible alert for different relationship scores.

For example, in FIG. 3A, computing device 10 may output, via output device 46, melody 80A at a tempo of 90 beats per minute (BPM) in a ¾ meter. Computing device 10 may output melody 80A as an initial audible alert in response to receiving a communication from a particular sender. In general, computing device 10 may output melody 80A in any instrumentation. For the example for FIG. 3A, melody 80A may be produced by a piano.

Computing device 10 may determine a relationship score indicating a degree of strength of a relationship between the particular sender and the user of computing device 10 based at least in part on a relationship context, as described above. In FIG. 3B, computing device 10 may determine a strong relationship score between the particular sender and the user of computing device 10. As such, to indicate the strong relationship score, computing device 10 may adjust one or more characteristics of melody 80A.

In the example of FIG. 3B, computing device 10 may adjust melody 80A to derive melody 80B and output melody 80B via output device 46. Melody 80B includes a major third harmony above the initial melody of melody 80A. Melody 80B further has a tempo of 120 BPM, and increase from the 90 BPM of melody 80A. In some examples, the major third harmony may be the same instrument as the original melody of melody 80A (i.e., the piano). In other examples, the major third harmony may be a different, complementary instrument to the piano of original melody 80A, such as a violin (i.e., within the same strings family as the piano) or a flute (i.e., an instrument outside of the strings family but with a texture that complements that of the piano).

Conversely, in FIG. 3C, computing device 10 may determine a weak relationship score between the particular sender and the user of computing device 10. As such, to indicate the weak relationship score, computing device 10 may adjust one or more characteristics of melody 80A.

In the example of FIG. 3C, computing device 10 may adjust melody 80A to derive melody 80C and output melody 80C via output device 46. Melody 80C includes a minor third harmony above the initial melody of melody 80A. Melody 80C further has a tempo of 600 BPM, and decrease from the 90 BPM of melody 80A. In some examples, the minor third harmony may be the same instrument as the original melody of melody 80A (i.e., the piano). In other examples, the minor third harmony may be a different, darker instrument from the piano of original melody 80A, such as a cello (i.e., within the same strings family as the piano) or a bassoon (i.e., an instrument outside of the strings family but with a texture darker than that of the piano).

Figure 4:
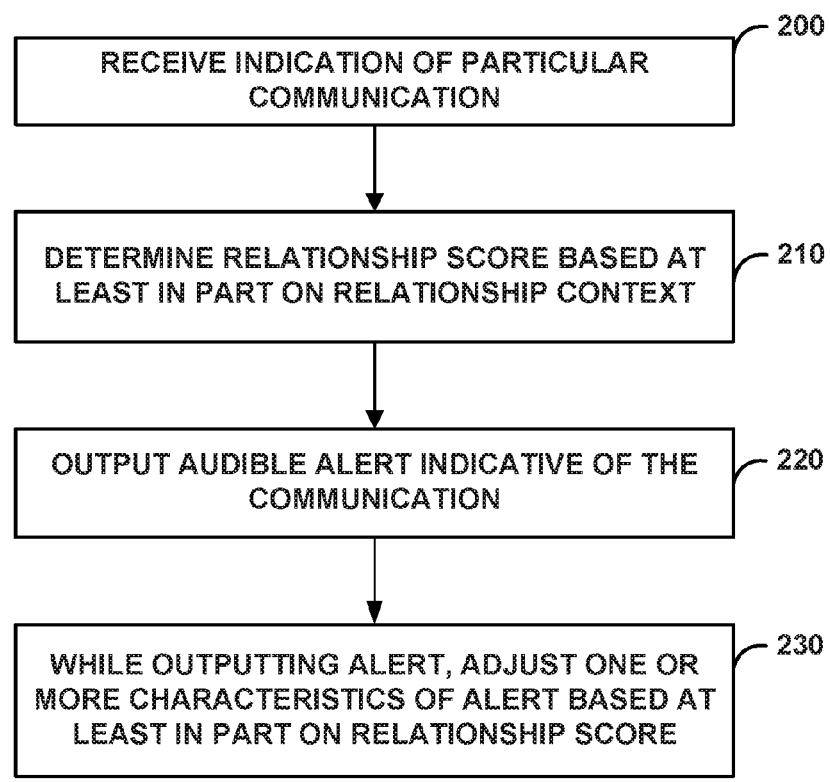
FIG. 4 is a flowchart illustrating example operations of an example computing device configured to output alerts indicative of a received communication and adjust one or more characteristics of the alert based on a relationship score between the sender of the communication and a user of the computing device, in accordance with one or more aspects of the present disclosure.

FIG. 4 is a flowchart illustrating example operations of an example computing device configured to output alerts indicative of a received communication and adjust one or more characteristics of the alert based on a relationship score between the sender of the communication and a user of the computing device, in accordance with one or more aspects of the present disclosure. The operations of computing device 10 are described within the context of system 1 of FIG. 1 and computing device 10 of FIG. 2. For example, in the example of FIG. 4, computing device 10 may be a computerized watch and information server system 60 may be a mobile phone.

In accordance with techniques of this disclosure, computing device 10 may dynamically adjust one or more characteristics of audible alerts that are output based on received communications to indicate, to a user of computing device 10, a degree or strength of a relationship between the user and a sender of the communications. For example, computing device 10 may receive an indication of a particular communication from a particular sender (200). For instance, computing device 10 may receive communication data from information server system 60 via network 30 that indicates an incoming telephone call from an unknown telemarketer. In the example of FIG. 2, the communication data may further be associated with a graphical indication output on UID 12 that indicates the incoming telephone call from the unknown telemarketer. In other examples, the communication may be a text message, a media message, a social media message, or a video telephone call.

Computing device 10 may determine, based at least in part on relationship context data between the particular sender and a user of computing device 10 stored in relationship context 24, a relationship score indicating a degree of strength of a relationship between the particular sender and the user of computing device 10 (210). For instance, responsive to computing device 10 receiving the particular communication from information server system 60, computing device 10 may place data associated with the communication into a notification queue. Computing device 10 may access this notification queue and obtain the data regarding the particular communication. Based on this obtained data, computing device 10 may determine an identity of the particular sender of the particular communication.

In the example of FIG. 4, computing device 10 may access the data in the notification queue to determine the identity of the particular sender of the received communication to be the unknown telemarketer. Using this identity, computing device 10 may determine a relationship score between the user of computing device 10 and the unknown telemarketer based on a relationship context between the user of computing device 10 and the unknown telemarketer.

While output device 46 is outputting an alert indicative of the communication (220), computing device 10 may adjust one or more characteristics of the alert based at least in part on the relationship score to audibly indicate to the user of computing device 10 the strength of the relationship between the user and the sender (230). For instance, the alert may be an audible alert. In adjusting the characteristics of the audible alert, computing device 10 may adjust a pitch of the audible alert, add or remove one or more harmonies to or from the audible alert, add or remove an instrument to or from the audible alert, adjust a tempo of the audible alert, play an additional version of a melody of the audible alert at an alternate octave, change a melody instrument for the audible alert, adjust a texture of the audible alert, change a key of the audible alert, or change a meter of the audible alert, among other things.

In other examples, computing device 10 may pre-generate the altered audible alert and store the audible alert in audible alert characteristics 26. In other words, prior to outputting the audible alert, computing device 10 may alter one or more characteristics the audible alert and output the altered audible alert. In still other examples, computing device 10 may pre-generate multiple audible alerts, each with different characteristics. Computing device 10 may associate each of these pre-generated audible alerts with a certain relationship score or a range of relationship scores in relationship context 24. Responsive to computing device 10 determining the relationship score of a particular sender, computing device 10 may save that score in relationship context 24, where computing device 10 may access the determined relationship score and select one of the pre-generated audible alerts that is associated with the determined relationship score and output the selected pre-generated audible alert.

Computing device 10 may adjust the characteristics of an audible alert in any manner that may be indicative of the relationship score. For instance, responsive to computing device 10 determining that the unknown telemarketer and the user have a strong relationship score, computing device 10 may adjust the audible alert in way that generally conveys a happier emotion, such as adding string instruments or bright, higher-pitched instruments (e.g, a flute or a clarinet). Conversely, responsive to relationship module 54 determining that the unknown telemarketer and the user have a weak relationship score, tone module 56 may adjust the audible alert in way that generally conveys a melancholier emotion, such as adding percussion instruments or lower-pitched brass instruments (e.g., a tuba or a trombone). This is only one example of ways that the relationship score may influence the audible alert. In other instances, the relationship score may influence the audible alert in other ways. In general, output module 20 adjusts the audible alert based on the relationship score in any manner that distinguishes a weak relationship score from a strong relationship score.

In some examples, to output an audible alert, computing device 10 may first select an initial tone for the audible alert. Computing device 10 may begin outputting the audible alert with the initial tone via output device 46 (e.g., a speaker). After outputting the alert the audible alert with the initial tone for a predetermined amount of time, computing device 10 may output the audible alert with a subsequent tone. To produce the subsequent tone, computing device 10 may adjust one or more characteristics of the initial tone, as described above. For instance, computing device 10 may adjust a pitch of the initial tone, add or remove one or more harmonies to or from the initial tone, add or remove an instrument to or from the initial tone, adjust a tempo of the initial tone, play an additional version of a melody of the initial tone at an alternate octave, change a melody instrument for the initial tone, adjust a texture of the initial tone, change a key of the initial tone, or change a meter of the initial tone, among other things.

In some instances, to select the initial tone, computing device 10 may select a default ringtone for computing device 10. In other instances, computing device 10 may access a music profile associated with the user of computing device 10. The music profile may be an account the user has on a music streaming service. In any case, the music profile includes a compilation of musical taste indicators for the user. For instance, the music profile may include indications that the user enjoys listening to specific artists, genres, songs, instruments, or moods of music. Computing device 10 may determine, based at least in part on the music profile associated with the user, a musical preference for the user. For the purposes of this disclosure, the musical preference may be a determined favorite artist, genre, song, instrument, or mood of music based on the various strengths of the musical taste indicators. Computing device 10 may then select the initial tone based at least in part on the musical preference. For instance, if computing device 10 determines that the user has a favorite song, computing device 10 may select the favorite song as the initial tone. In other instances, if computing device 10 determines that the user has a favorite genre of music, computing device 10 may select an initial tone from the favorite genre.

In some examples, to adjust the one or more characteristics of the audible alert, computing device 10 may utilize a neural network associated with the audible alert. Specifically, computing device 10 may analyze samples of at least the original audible alert to identify tones, pitches, instrumentation, and other characteristics of the audible alert. Computing device 10 may further analyze samples of other audible alerts that are similar to the original audible alert to identify tones, pitches, instrumentation, and other characteristics of the other audible alerts and strengthen the neural network for the purpose of more accurately predicting pitches, tones, and instrumentations for the altered audible alert. These sample sequences may be input to the neural network as waveforms for the purpose of training the neural network. The neural network may be a multi-layered neural network where each layer of the neural network has various dilation factors that enable its receptive field to grow exponentially with depth and cover thousands of time-steps. From this neural network, computing device 10 may sample the neural network to generate synthetic sequences that match or complement the instrumentation, pitch, and tone of the inputted waveforms. During the sampling, computing device 10 may determine a value drawn from a probability distribution computed from the neural network. Computing device 10 may then input this value into a new prediction for the next step of generating the synthetic sequence, stringing together a synthetic sequence of realistic sounding audio that complements the initial audible alert. By utilizing a trained neural network generated from samples including the original audible alert, computing device 10 may synthetically generate realistic sounding audio, enabling computing device 10 to produce customized and alterations to the original audible alert that sounds realistic and aesthetically pleasing without actually storing large data files of every potential tone that may be output by computing device 10.

In some examples, computing device 10 may adjust the one or more characteristics of the audible alert based on other information in addition to the relationship score. For instance, computing device 10 may adjust the one or more characteristics of the audible alert based on contextual information associated with computing device 10. In some examples, the contextual information may include environmental information about a current operating environment of computing device 10, such as a location of the computing device, a current time of day, or a current weather status. In such instances, computing device 10 may determine the contextual information associated with computing device 10 and adjust the one or more characteristics of the audible alert based at least in part on the relationship score and the contextual information.

For instance, in the context of FIG. 4, computing device 10 may determine a weak relationship score between the user and the unknown telemarketer. As such, computing device 10 may first adjust the initial tone by adding deep bass instruments to the initial tone. Computing device 10 may then determine the current weather is a blizzard. Computing device 10 may then further adjust the initial tone by slowing the tempo of the audible alert. Conversely, if computing device 10 determines that the current weather is warm and sunny, computing device 10 may speed up the tempo of the audible alert.

Although the above examples were provided in the context of an audible alert, techniques of this disclosure may apply to other types of alerts, as well. For instance, the alert may be a tactile alert. In such examples, computing device 10 may provide a sequence of vibrations as the alert indicative of the communication. As such, while outputting the tactile alert, computing device 10 may adjust one or more characteristics of the tactile alert bit adjusting one of a vibration rate, a vibration pattern, or a vibration intensity of the tactile alert.

In other instances, the alert may be a visual alert. In such examples, computing device 10 may provide a sequence of light flashes as the alert indicative of the communication. As such, while outputting the visual alert, computing device 10 may adjust one or more characteristics of the visual alert bit adjusting one of a flash rate, a flash pattern, or a flash intensity of the tactile alert.

EXAMPLE 1

A method comprising: receiving, by a computing device, an indication of a particular communication from a particular sender; determining, by the computing device, based at least in part on a relationship context between the particular sender and a user of the computing device, a relationship score indicating a degree of strength of a relationship between the particular sender and the user of the computing device; and while outputting an alert indicative of the communication, adjusting, by the computing device and based at least in part on the relationship score, one or more characteristics of the alert.

EXAMPLE 2

The method of example 1, wherein the relationship context comprises a frequency at which the computing device receives communications from one or more computing devices associated with the particular sender.

EXAMPLE 3

The method of example 2, further comprising: determining, by the computing device, based at least in part on a communication history associated with the computing device and an identity of the particular sender, the relationship context.

EXAMPLE 4

The method of any of examples 1-3, wherein the alert comprises an audible alert, and wherein adjusting the one or more characteristics of the audible alert comprises one or more of: adjusting a pitch of the audible alert, adding one or more harmonies to the audible alert, adding an instrument to the audible alert, adjusting a tempo of the audible alert, playing an additional version of a melody of the audible alert at an alternate octave, changing a melody instrument for the audible alert, adjusting a texture of the audible alert, changing a key of the audible alert, or changing a meter of the audible alert.

EXAMPLE 5

The method of any of examples 1-4, wherein the alert comprises an audible alert, and wherein the method further comprises: selecting, by the computing device, an initial tone for the audible alert; outputting, by the computing device and via an audio output device operatively connected to the computing device, the audible alert with the initial tone; after outputting the audible alert with the initial tone for a predetermined amount of time, outputting, by the computing device, the audible alert with a subsequent tone, wherein outputting the audible alert with the subsequent tone includes adjusting, by the computing device and based at least in part on the relationship score, one or more characteristics of the initial tone to produce the subsequent tone.

EXAMPLE 6

The method of example 5, wherein selecting the initial tone comprises: accessing, by the computing device, a music profile associated with the user of the computing device, wherein the music profile comprises a compilation of musical taste indicators for the user; determining, by the computing device and based at least in part on the music profile associated with the user, a musical preference for the user; and selecting, by the computing device and based at least in part on the musical preference, the initial tone.

EXAMPLE 7

The method of any of examples 1-6, wherein the relationship context comprises one or more of: a presence of one or more computing devices associated with the particular sender in a contact list for the computing device, a connection status between a first social media account associated with the computing device and a second social media account associated with the particular sender, or an average time between when the computing device begins to output the alert in response to receiving a communication from the one or more computing devices associated with the particular sender and when the computing device receives an indication of a user input to respond to the communication.

EXAMPLE 8

The method of any of examples 1-7, wherein the communication comprises one of a text message, a media message, a social media message, an audio call, or a video call.

EXAMPLE 9

The method of any of examples 1-8, further comprising: determining, by the computing device, contextual information associated with the computing device, wherein the contextual information comprises environmental information about a current operating environment of the computing device; and while outputting the alert indicative of the communication, adjusting, by the computing device and based at least in part on the relationship score and the contextual information, the one or more characteristics of the alert.

EXAMPLE 10

The method of example 9, wherein the contextual information comprises one or more of a location of the computing device, a current time of day, or a current weather status.

EXAMPLE 11

The method of any of examples 1-10, wherein the alert comprises an audible alert, and wherein adjusting the one or more characteristics of the audible alert comprises: training, by the computing device, a multi-layered neural network using one or more waveforms, wherein a first waveform of the one or more waveforms comprises a waveform of the audible alert; computing, by the computing device and based at least in part on the multi-layered neural network, a probability distribution for the audible alert; determining, by the computing device and based at least in part on the probability distribution, a prediction value; and adjusting, by the computing device and based at least in part on the determined prediction value, the one or more characteristics of the audible alert.

EXAMPLE 12

The method of any of examples 1-11, wherein the alert comprises one of a tactile alert or a visual alert, and wherein adjusting the one or more characteristics of the alert comprises one or more of: adjusting a vibration rate of the tactile alert, adjusting a vibration pattern of the tactile alert, adjusting a vibration intensity of the tactile alert, adjusting a flash pattern of the visual alert, adjusting a flash rate of the visual alert, or adjusting a flash intensity of the visual alert.

EXAMPLE 13

The method of any of examples 1-12, wherein determining the relationship score comprises: sending, by the computing device and to a server device, an indication of the particular sender; and receiving, by the computing device and from the server device, the relationship score.

EXAMPLE 14

A computing device comprising: at least one processor; and at least one non-transitory computer-readable storage medium storing instructions that are executable by the at least one processor to: receive an indication of a particular communication from a particular sender; determine, based at least in part on a relationship context between the particular sender and a user of the computing device, a relationship score indicating a degree of strength of a relationship between the particular sender and the user of the computing device; and while outputting an alert indicative of the communication, adjust, based at least in part on the relationship score, one or more characteristics of the alert.

EXAMPLE 15

The computing device of example 14, wherein the relationship context comprises a frequency at which the computing device receives communications from one or more computing devices associated with the particular sender.

wherein the instructions are further executable by the at least one processor to: determine, based at least in part on a communication history associated with the computing device and an identity of the particular sender, the relationship context.

EXAMPLE 16

The computing device of any of examples 14-15, wherein the alert comprises an audible alert, and wherein the instructions are further executable by the at least one processor to: select an initial tone for the audible alert; output, via an audio output device operatively connected to the computing device, the audible alert with the initial tone; after outputting the audible alert with the initial tone for a predetermined amount of time, output the audible alert with a subsequent tone, wherein outputting the audible alert with the subsequent tone includes adjusting, by the computing device and based at least in part on the relationship score, one or more characteristics of the initial tone to produce the subsequent tone.

EXAMPLE 17

The computing device of any of examples 14-16, wherein the relationship context comprises one or more of: a presence of one or more computing devices associated with the particular sender in a contact list for the computing device, a connection status between a first social media account associated with the computing device and a second social media account associated with the particular sender, or an average time between when the computing device begins to output the alert in response to receiving a communication from the one or more computing devices associated with the particular sender and when the computing device receives an indication of a user input to respond to the communication.

EXAMPLE 18

The computing device of any of examples 14-17, wherein the instructions are further executable by the at least one processor to: determine contextual information associated with the computing device, wherein the contextual information comprises environmental information about a current operating environment of the computing device; and while outputting the alert indicative of the communication, adjust, based at least in part on the relationship score and the contextual information, the one or more characteristics of the alert, wherein the contextual information comprises one or more of a location of the computing device, a current time of day, or a current weather status.

EXAMPLE 19

A non-transitory computer-readable storage medium storing instructions that, when executed, cause at least one processor of a computing device to: receive an indication of a particular communication from a particular sender; determine, based at least in part on a relationship context between the particular sender and a user of the computing device, a relationship score indicating a degree of strength of a relationship between the particular sender and the user of the computing device; and while outputting an alert indicative of the communication, adjust, based at least in part on the relationship score, one or more characteristics of the alert.

EXAMPLE 20

The non-transitory computer-readable storage medium of example 19, wherein the relationship context comprises a frequency at which the computing device receives communications from one or more computing devices associated with the particular sender. wherein the instructions further cause the at least one processor to: determine, based at least in part on a communication history associated with the computing device and an identity of the particular sender, the relationship context.

EXAMPLE 21

A computing device configured to perform any of the methods of examples 1-14.

EXAMPLE 22

A computing device comprising means for performing any of the methods of examples 1-14.

EXAMPLE 23

A computer-readable storage medium encoded with instructions for causing one or more programmable processors to perform any of the methods or examples 1-14.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

The invention claimed is:

1. A method comprising:
receiving, by a computing device, an indication of a particular communication from a particular sender;
determining, by the computing device, based at least in part on a relationship context between the particular sender and a user of the computing device, a relationship score indicating a degree of strength of a relationship between the particular sender and the user of the computing device; and
while outputting an alert indicative of the communication, adjusting, by the computing device and based at least in part on the relationship score, one or more characteristics of the alert.

2. The method of claim 1, wherein the relationship context comprises a frequency at which the computing device receives communications from one or more computing devices associated with the particular sender.

3. The method of claim 2, further comprising:
determining, by the computing device, based at least in part on a communication history associated with the computing device and an identity of the particular sender, the relationship context.

4. The method of claim 1, wherein the alert comprises an audible alert, and wherein adjusting the one or more characteristics of the audible alert comprises one or more of:
adjusting a pitch of the audible alert,
adding one or more harmonies to the audible alert,
adding an instrument to the audible alert,
adjusting a tempo of the audible alert,
playing an additional version of a melody of the audible alert at an alternate octave,
changing a melody instrument for the audible alert,
adjusting a texture of the audible alert,
changing a key of the audible alert, or
changing a meter of the audible alert.

5. The method of claim 1, wherein the alert comprises an audible alert, and wherein the method further comprises:
  selecting, by the computing device, an initial tone for the audible alert;
  outputting, by the computing device and via an audio output device operatively connected to the computing device, the audible alert with the initial tone;
  after outputting the audible alert with the initial tone for a predetermined amount of time, outputting, by the computing device, the audible alert with a subsequent tone, wherein outputting the audible alert with the subsequent tone includes adjusting, by the computing device and based at least in part on the relationship score, the one or more characteristics of the initial tone to produce the subsequent tone.

6. The method of claim 5, wherein selecting the initial tone comprises:
  accessing, by the computing device, a music profile associated with the user of the computing device, wherein the music profile comprises a compilation of musical taste indicators for the user;
  determining, by the computing device and based at least in part on the music profile associated with the user, a musical preference for the user; and
  selecting, by the computing device and based at least in part on the musical preference, the initial tone.

7. The method of claim 1, wherein the relationship context comprises one or more of:
  a presence of one or more computing devices associated with the particular sender in a contact list for the computing device,
  a connection status between a first social media account associated with the computing device and a second social media account associated with the particular sender, or
  an average time between when the computing device begins to output the alert in response to receiving a communication from the one or more computing devices associated with the particular sender and when the computing device receives an indication of a user input to respond to the communication.

8. The method of claim 1, wherein the communication comprises one of a text message, a media message, a social media message, an audio call, or a video call.

9. The method of claim 1, further comprising:
  determining, by the computing device, contextual information associated with the computing device, wherein the contextual information comprises environmental information about a current operating environment of the computing device; and
  while outputting the alert indicative of the communication, adjusting, by the computing device and based at least in part on the relationship score and the contextual information, the one or more characteristics of the alert.

10. The method of claim 9, wherein the contextual information comprises one or more of a location of the computing device, a current time of day, or a current weather status.

11. The method of claim 1, wherein the alert comprises an audible alert, wherein adjusting the one or more characteristics of the audible alert comprises:
  training, by the computing device, a multi-layered neural network using one or more waveforms, wherein a first waveform of the one or more waveforms comprises a waveform of the audible alert;
  computing, by the computing device and based at least in part on the multi-layered neural network, a probability distribution for the audible alert;
  determining, by the computing device and based at least in part on the probability distribution, a prediction value; and
  adjusting, by the computing device and based at least in part on the determined prediction value, the one or more characteristics of the audible alert.

12. The method of claim 1, wherein the alert comprises one of a tactile alert or a visual alert, and wherein adjusting the one or more characteristics of the alert comprises one or more of:
  adjusting a vibration rate of the tactile alert,
  adjusting a vibration pattern of the tactile alert,
  adjusting a vibration intensity of the tactile alert,
  adjusting a flash pattern of the visual alert,
  adjusting a flash rate of the visual alert, or
  adjusting a flash intensity of the visual alert.

13. The method of claim 1, wherein determining the relationship score comprises:
  sending, by the computing device and to a server device, an indication of the particular sender; and
  receiving, by the computing device and from the server device, the relationship score.

14. A computing device comprising:
  at least one processor; and
  at least one non-transitory computer-readable storage medium storing instructions that are executable by the at least one processor to:
    receive an indication of a particular communication from a particular sender;
    determine, based at least in part on a relationship context between the particular sender and a user of the computing device, a relationship score indicating a degree of strength of a relationship between the particular sender and the user of the computing device; and
    while outputting an alert indicative of the communication, adjust, based at least in part on the relationship score, one or more characteristics of the alert.

15. The computing device of claim 14, wherein the relationship context comprises a frequency at which the computing device receives communications from one or more computing devices associated with the particular sender, and wherein the instructions are further executable by the at least one processor to:
  determine, based at least in part on a communication history associated with the computing device and an identity of the particular sender, the relationship context.

16. The computing device of claim 14, wherein the alert comprises an audible alert, and wherein the instructions are further executable by the at least one processor to:
  select an initial tone for the audible alert;
  output, via an audio output device operatively connected to the computing device, the audible alert with the initial tone;
  after outputting the audible alert with the initial tone for a predetermined amount of time, output the audible alert with a subsequent tone, wherein outputting the audible alert with the subsequent tone includes adjusting, by the computing device and based at least in part on the relationship score, the one or more characteristics of the initial tone to produce the subsequent tone.

17. The computing device of claim 14, wherein the relationship context comprises one or more of:
  a presence of one or more computing devices associated with the particular sender in a contact list for the computing device, a connection status between a first social media account associated with the computing device and a second social media account associated with the particular sender, or an average time between when the computing device begins to output the alert in response to receiving a communication from the one or more computing devices associated with the particular sender and when the computing device receives an indication of a user input to respond to the communication.

18. The computing device of claim 14, wherein the instructions are further executable by the at least one processor to:

determine contextual information associated with the computing device, wherein the contextual information comprises environmental information about a current operating environment of the computing device; and while outputting the alert indicative of the communication, adjust, based at least in part on the relationship score and the contextual information, the one or more characteristics of the alert, wherein the contextual information comprises one or more of a location of the computing device, a current time of day, or a current weather status.

19. A non-transitory computer-readable storage medium storing instructions that, when executed, cause at least one processor of a computing device to:

receive an indication of a particular communication from a particular sender;

determine, based at least in part on a relationship context between the particular sender and a user of the computing device, a relationship score indicating a degree of strength of a relationship between the particular sender and the user of the computing device; and while outputting an alert indicative of the communication, adjust, based at least in part on the relationship score, one or more characteristics of the alert.

20. The non-transitory computer-readable storage medium of claim 19, wherein the relationship context comprises a frequency at which the computing device receives communications from one or more computing devices associated with the particular sender, wherein the instructions further cause the at least one processor to:

determine, based at least in part on a communication history associated with the computing device and an identity of the particular sender, the relationship context.

\* \* \* \* \*